United States Patent [19]

Nitschke

[11] Patent Number: 4,635,180

[45] Date of Patent: Jan. 6, 1987

[54] DEVICE FOR CONTROLLING AND REGULATING CURRENT FLOWING THROUGH AN ELECTROMAGNETIC CONSUMER, PARTICULARLY FOR USE IN CONNECTION WITH AN INTERNAL COMBUSTION ENGINE

[75] Inventor: Werner Nitschke, Ditzingen, Fed. Rep. of Germany

[73] Assignee: Robert Bosch GmbH, Stuttgart, Fed. Rep. of Germany

[21] Appl. No.: 722,187

[22] Filed: Apr. 10, 1985

[30] Foreign Application Priority Data

Jun. 2, 1984 [DE] Fed. Rep. of Germany ....... 3420611

[51] Int. Cl.⁴ ........................ H02P 13/20; G05F 1/56

[52] U.S. Cl. ........................................ 363/98; 363/132

[58] Field of Search .............................. 363/17, 55-56, 363/97-98, 131-132

[56] References Cited

U.S. PATENT DOCUMENTS 4,099,225 7/1978 Nygaard ................................ 363/56

4,325,095 4/1952 Hart .................................. 363/98 X 4,410,935 10/1983 Dang ................................. 363/98 X 4,520,438 5/1985 Norton ................................. 363/98

*Primary Examiner*—Peter S. Wong

*Attorney, Agent, or Firm*—Michael J. Striker

[57] ABSTRACT

A device for controlling and/or regulating current flowing through an electromagnetic consumer, particularly in a control system of an internal combustion engine, is based on the separation of the control of current intensity through the consumer from the control of the direction of this current. This separation is achieved by the provision of a bridge circuit of four current amplifying units whose one diagonal branch is formed by the electromagnetic consumer and the other diagonal branch is formed by a series connection of power source an additional current controlling unit and a measuring resistor. The additional current controlling unit is controlled by a separate current intensity control signal whereas the bridge circuit is controlled by another, current polarity control signal.

4 Claims, 4 Drawing Figures

DEVICE FOR CONTROLLING AND REGULATING CURRENT FLOWING THROUGH AN ELECTROMAGNETIC CONSUMER, PARTICULARLY FOR USE IN CONNECTION WITH AN INTERNAL COMBUSTION ENGINE

BACKGROUND OF THE INVENTION

The present invention relates to a device for controlling and/or regulating an electric current flowing through an electromagnetic consumer, the device being of the type which includes a bridge circuit assembled of four current controlling units in which the electromagnetic consumer is connected in the diagonal branch.

In the German publication No. 21 32 717 a current regulating device is disclosed in which a measuring resistor, a current controlling unit and an electromagnetic consumer are connected in series. By means of the current controlling unit the potential at the connection point between the measuring resistor and the consumer is regulated to a desired value. Accordingly, a predetermined unidirectional current flowing through the electromagnetic consumer can be generated. From the German patent application P No. 33 25 044.8 a current regulator is known which consists of four current controlling units connected in a bridge circuit whose diagonal branch includes a series connection of a measuring resistor and an electromagnetic consumer. By means of the four current controlling units the desired potential is adjusted across the measuring resistor. In this manner, a predetermined current flowing through the consumer in either direction can be adjusted.

The latter device, however, requires a complicated and expensive circuit design which can be realized only with a large number of circuit components. Moreover, this known device cannot change the rating of the predetermined value of the current flowing through the consumer.

SUMMARY OF THE INVENTION

A general object of the present invention therefore is to overcome the aforementioned disadvantages.

More particularly, it is an object of the invention to provide an improved controlling or regulating device which in comparison with prior art devices of this kind has the advantage of a substantially simpler construction requiring a reduced number of circuit components.

Another object of this invention is to provide such an improved current controlling or regulating device for an electromagnetic consumer which makes it possible to change arbitrarily the preset value of the current flowing through the consumer.

In keeping with these objects and others which will become apparent hereinafter, one feature of the invention resides in the separation of the control of the setting current from the control of the polarity of the setting current. This separation is achieved, in the bridge circuit consisting of four current controlling units and a consumer connected in the diagonal branch of the bridge, in the provision of a series connection of an additional current control unit with a measuring resistor forming the other diagonal of the bridge circuit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
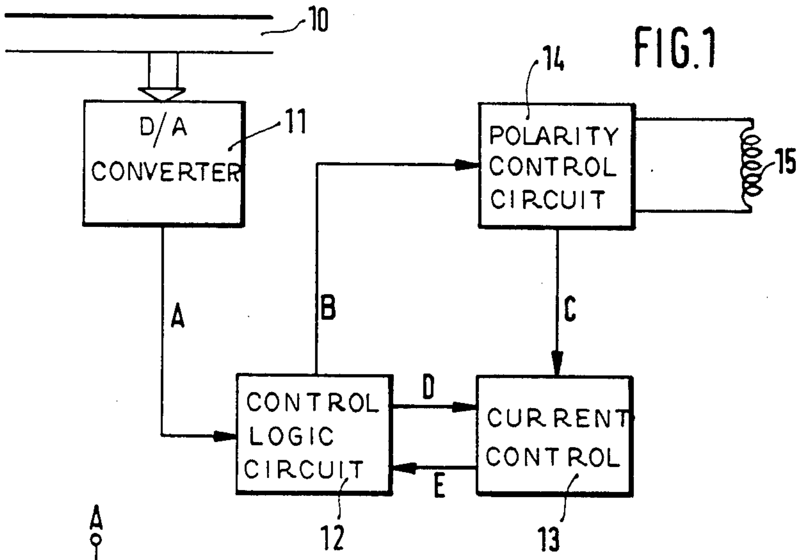
FIG. 1 is a block circuit diagram of an embodiment of the device of this invention.

In the preferred embodiment of this invention illustrated in the Figures, the device according to this invention is shown in connection with an electromagnetic final adjuster in a control system for an internal combustion engine. In the block circuit diagram of FIG. 1, reference numeral 10 denotes a data and/or address bus of a digital computing device, connected to a digital to analog converter 11 connected to an input of a control logic circuit 12. An output of circuit 12 is connected to a polarity control circuit 14 and another output and input of circuit 12 are connected to a current control and determination circuit 13. An output of the polarity control circuit 14 is connected to an input of the circuit 13 and an electromagnetic adjuster 15 is connected to the outputs of the circuit 14.

The digital/analog converter 11 converts digital data received from the bus 10 into an analog voltage signal A which represents a preset voltage $U_A$ for the electromagnetic adjuster 15. The digital/analog converter 11 can be of any conventional construction, for example in the form of commercially available intgrated circuit or made of discrete components. This circuit is not part of this invention and therefore will not be described in detail. The purpose of control logic circuit 12 is to control the current control and determination circuit 13 as well as the polarity control circuit 14 in such a manner that a current corresponding to the adjuster voltage $U_A$ is supplied in the electromagnetic adjuster 15. The current control and determination circuit 17 delivers a current determination signal E which is applied to an input of the circuit 12. In dependency on the received analog signal A and the current determination signal E the control logic circuit 12 generates two output signals, namely a polarity control signal B and a current control signal D. The function of the current control and determination circuit 13 is to adjust the desired value of the current for the electromagnetic adjuster and to determine the actual intensity of current flowing through the adjuster. For this purpose, the input signal C from the circuit 14 is indicative of the actual current $I_C$ flowing through the adjuster 15. The output signal B from the control logic circuit 12 controls via the circuit 13 the current flowing through the electromagnetic adjuster 15. In particular, from detected actual value of the current $I_C$ flowing through the adjuster the circuit 13 generates a signal E which is fed back to the circuit 12. The function of the polarity control circuit 14 is to control the direction of current flowing through the adjuster 15. The polarity or direction of the current $I_C$ is controlled by the polarity signal B from the circuit 12.

The intensity of the adjuster current $I_C$ however is independent on its direction and the same control signal $I_C$ is delivered to the current control and determination circuit 13.

Figure 2:
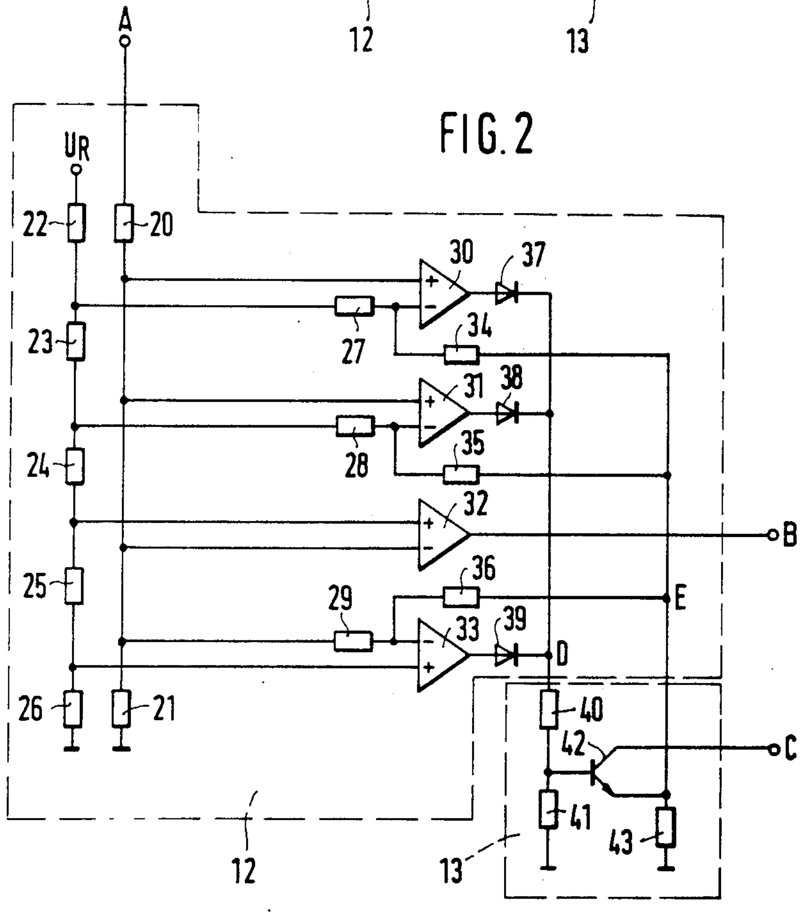
FIG. 2 is a schematic circuit diagram of the control logic circuit and of the current control and determination circuit of FIG. 1.

FIG. 2 illustrates in greater detail the control logic circuit 12 and the current control and determination circuit 13 of FIG. 1. The control logic circuit includes a first voltage divider consisting of resistors 20 and 21 and second voltage divider consisting of resistors 22 through 26. The logic circuit further includes four operational amplifiers 30 through 33 of which amplifiers 30 and 31 have their non-inverting inputs (+) connected to the tapping point of the first voltage divider and the non-inverting inputs of amplifiers 32 and 33 are connected to tapping points between resistors 24, 25 and 26 of the second voltage divider. Inverting inputs (−) of the amplifiers 30 and 31 are connected via resistors 27 and 28 to tapping points between resistors 22, 23 and 24 of the second voltage divider, and the inverting input of amplifier 32 is directly connected and the inverting input of amplifier 33 is connected via a resistor 29 to the tapping point of the first voltage divider between resistor 20 and 21. The inverting inputs of amplifiers 30, 31 and 33 are further connected via feedback resistors 34, 35 and 36 to an input terminal E. The outputs of the amplifiers 30, 31 and 33 are further connected via diodes 37, 38 and 39 to an output terminal D, and the output of amplifier 32 is connected to an output terminal B. The current control and determination circuit 13 includes a voltage divider 40 and 41 connected between the output terminal D and ground and having its tapping point connected to a current control unit in the form of a transistor 42 whose emitter is grounded via measuring resistor 43 and whose collector is connected to the input terminal C. The first voltage divider 20, 21 in logic circuit 12 is connected between ground and an input terminal A connected to the output of D-A converter 11. Accordingly, the first voltage divider is supplied with the setting voltage $U_A$ determining the desired value of the current through the electromagnetic adjuster 15.

The second voltage divider 22 through 26 is grounded and connected at its free end (resistor 22) to a terminal $U_R$ for a reference voltage. The beforedescribed terminals A, B, C, D and E are supplied with corresponding input and output signals A through E as indicated in FIG. 1.

Figure 3:
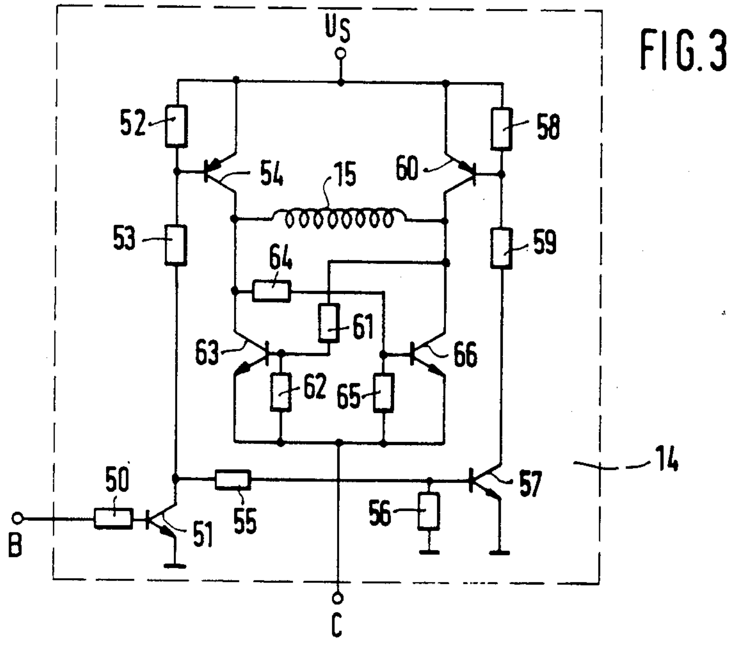
FIG. 3 is a schematic circuit diagram of the polarity control circuit of FIG. 1.

As described above, the voltage divider 40, 41 in circuit 13 is connected between the output terminal D of logic circuit 12 and ground to receive the signal D for controlling the current flowing in adjuster 15. The emittor of transistor 42 which is grounded via the measuring resistor 43, is further connected to the input terminal E of the logic circuit 12. The collector of the transistor 42 is connected to the output terminal C of polarity control circuit 14 as indicated in FIGS. 1 and 3. The terminal C delivers a signal which is indicative of the current $I_C$ flowing through the adjuster 15.

The functioning of circuits 12 and 13 is based on the separation of the polarity or current direction control from the current intensity control. The current $I_C$ flowing through the electromagnetic adjuster flows also through the terminal C and through the collector-emittor circuit of transistor 42 and measuring resistor 43 to ground. Accordingly, a voltage drop proportional to the adjuster current $I_C$ is generated across the measuring resistor 43 and this voltage corresponding to the current detecting signal E is applied through terminal E and feedback resistors 34, 35 and 36 to the inverting inputs of operational amplifiers 30, 31 and 33. By means of the second voltage divider 22 through 26, reference potentials applied to the inverting (−) inputs of operational amplifiers 30 and 31 and to the non-inverting input (+) of amplifier 33' have different values. As mentioned before, the signal A applied to the first voltage divider 20, 21 represents a desired or setting voltage $U_A$. This setting voltage is applied to the non-inverting inputs 30 through 32 and via register 29 to the inverting input of amplifier 33. In this manner, the operational amplifiers 30, 31 and 33 compare the setting voltage $U_A$ with the input signal E which is indicative of the adjuster current $I_C$. Depending on the difference between these two input voltages an output signal is applied to the output terminal D. Due to the fact that the amplifiers 30, 31 and 33 receive different reference voltages from the tapping points of the second voltage divider 22 through 26, the output signals from respective amplifiers 30, 31 and 33 also differ from one another. These output signals are interconnected by the diodes 37, 38 and 39 to form a logic OR circuit which passes through an output signal having a highest value. Negative or low signals are suppressed by the diodes. The output signal at terminal D flows through the voltage divider 40, 41 in the circuit 13 and adjusts via the current control unit 42 the current $I_C$ passing through the adjuster. The operational amplifier 32 is connected as a comparator for comparing the setting voltage $U_A$ with a value of the reference voltage at a tapping point of the second voltage divider between the resistors 24 and 25. Depending on the magnitude of the input signal A with respect to the preset reference voltage, the polarity of the output signal B of the amplifier 32 is switched over. This polarity or current direction determining signal B is applied to the circuit 14.

In summary, the circuits 12 and 13 shown in FIG. 2 represent a compound or separated regulation of the adjuster current $I_C$. For this purpose, the adjuster current is measured, compared with a preset reference value and then controlled according to the result of the comparison. By means of mutually separated preset values it is made possible to distinguish different ranges of the setting voltage $U_A$ and to establish different relationships between the setting voltage $U_A$ and the adjuster current $I_C$ in respective ranges. In this manner, a combined or separated current regulation is obtained.

FIG. 3 illustrates a schematic circuit diagram of a polarity or current direction control. The polarity control circuit 14 includes a pair of transistors 54 and 60 of one type of conductivity and another pair of transistors 63 and 66 of another type of conductivity, both pairs of transistors being connected into a bridge circuit with the electromagnetic adjuster 15 connected at one diagonal branch. Circuit 14 further includes a battery terminal for supply voltage $U_S$ and a terminal C connected in the other diagonal of the bridge circuit whereby the terminal C is grounded via the collector-emitter circuit of transistor 42 and the measuring resistor 43. A biasing network consisting of voltage dividers 52 and 53, 58 and 59, 61 an 62, 64 and 65 is connected to the bases of respective current amplifying transistors in the bridge circuit whereby the voltage dividers 52, 53 and 58, 59 are connected respectively to collector-emitter circuits of transistors 51 and 57, the latter being biased by a voltage divider 55 and 56 whereas the former transistor 51 has its base connected via a resistor 50 to the terminal B of the control logic circuit 12. The electric current consumer in the form of adjusters 15 is connected between the connection points of collectors of transistor 54, 63 and 60, 66. The terminal B as mentioned before, receives the polarity control signal B whereas the current flowing through the terminal C corresponds to the current $I_C$ flowing through the adjuster 15.

The task of the polarity control circuit of FIC. 3 is to control the direction of current flowing through the electromagnetic adjuster. The change of the direction of the adjuster current is accomplished by the polarity control signal B delivered by the operational amplifier 32 of the control logic circuit 12. Depending on the ratio between the output signal A from the D/A converter 11 and the reference voltage $U_R$, the polarity signal is either a positive voltage or a ground potential. In the former case, when the signal B is positive, transistors 51, 54, and 66 are conductive whereas transistors 57, 60 and 63 are blocked. Consequently, battery voltage $U_S$ causes current to flow through transistor 54, the electro-magnetic adjuster 15, the transistor 66 and via the terminal C through the transistor 42 and measuring resistor 43 in the circuit 13. In the second case, that is when the polarity signal B is at the ground potential, the transistors 57, 60 and 63 are conductive whereas transistors 51, 54 and 66 are blocked. Accordingly, current from the power source $U_S$ flows in opposite direction through transistor 60, the electromagnetic adjuster 15 and transistor 63 to the terminal C. In summary, by changing the polarity of logic level at the output B of the circuit 12, the current flowing through the consumer 15 changes its direction. On the other hand, the polarity control circuit 14 has no effect on the intensity of the current $I_C$ flowing through the consumer 15.

Figure 4:
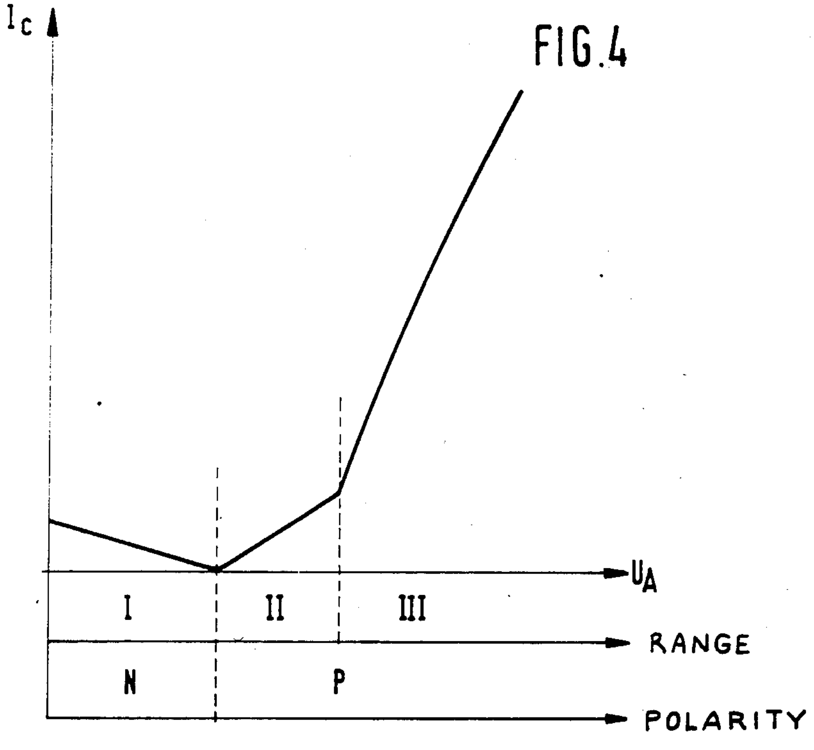
FIG. 4 is a plot diagram showing an example of a characteristic line of adjuster voltage versus adjuster current obtained by the device of FIG. 1.

FIG. 4 depicts an adjuster voltage versus adjuster current characteristic line obtained by means of the current controlling or regulating device according to FIGS. 1 through 3. The adjuster voltage $U_S$ is plotted on the abscissa of the diagram, whereas the adjuster current $I_C$ is plotted on the ordinate. The adjuster voltage $U_A$ is divided in three regions I, II and III. It will be seen from FIG. 4 that in each of these regions different relationships between the adjuster voltage and the adjuster current are established. The region I corresponds to a negative adjuster voltage $U_A$ whereas regions II and III pertain to a positive adjuster voltage. In the negative region N of the adjuster voltage current $I_C$ flows in one direction whereas in the positive regions P currrent flows in the opposite direction. For example, in the negative region the characteristic line has a relatively small degree of inclination, whereas in the positive voltage regions II and III the intensity of the opposite current changes at an increased rate with respect to the region I. In other words the characteristic line in region II has a larger slope and in the region III has its maximum slope. The differences in the inclination of respective regions I through III are adjusted by means of different feedback voltage dividers in the operational amplifier 30, 31 and 33 of the control logic circuit 12. The switchover of the polarity from the negative to a positive range of the adjuster voltage, as explained before, is accomplished by the operational amplifier 32 (FIG. 2). It will be pointed out however, that while the direction of current flowing through the electromagnetic adjuster 15 can be controlled to flow in either direction, the current $I_C$ flowing through the terminal C is always unidirectional, in this example flowing in positive direction. This feature can be seen in the plot diagram of FIG. 4 where the current $I_C$ is always unidirectional. Only by reversing the type of conductivity of the employed transistors the direction of the current $I_C$ can be reversed.

In summary, by means of the device of this invention the current flowing through an electromagnetic consumer can be regulated in response to a setting voltage to assume certain predetermined values. This regulation is made possible by the separate control of intensity of the current flowing through the consumer and by the separate control of the direction of this current. By virtue of the separation of the polarity and intensity controls it is made possible to change in simple manner the relationship between the adjuster voltage and the adjuster current.

The device of this invention enables also to modify in the most advantageous manner the dependency between the adjuster voltage and the adjuster current. That means, that almost all possible courses or shapes of voltage-current characteristic lines can be reproduced with a sufficient accuracy. The range of the characteristic line can be also increased by means of additional operational amplifiers in the control logic circuit 12 whereby the additional amplifiers can be interconnected on the same principle as desribed before.

In still another embodiment it is also possible to simplify the construction of the circuit of FIG. 2. For example instead of using operational amplifier 32 for switching over the direction of the consumer current, it is possible to use directly a signal from the digital computing device which directly delivers via the data or address bus 10 the polarity switchover signal to the terminal B or indirectly to the terminal D of the polarity control circuit of FIG. 3.

Still another advantageous simplification of the circuit of FIG. 2 can be achieved by substituting the function of the operational amplifier 33 by signals from the digital computing device. This modification can be realized for example by programing the computing device so as to deliver a signal which corresponds to the desired intensity of current flowing through the electromagnetic adjuster, and in addition, another signal which indicates the desired direction of the current through the adjuster. In this modification, the operational amplifiers 30 and 31 remain in the circuit in order to achieve that the characteristic line shown in FIG. 4 has a symmetrical course with respect to the point of the polarity switchover. Of particular advantage in this simplified embodiment is the fact that the accuracy of the adjustment of the desired current through the electromagnetic consumer can be substantially increased and also an emergency operation of the computer control device of this invention will be improved.

It will be understood that each of the elements described above, or two or more together, may also find a useful application in other types of constructions differing from the types described above.

While the invention has been illustrated and described as embodied in a device for controlling or regulating current flowing through an electromagnetic consumer used in connection with an internal combustion engine, and controlled by signals from a digital computing device, it is not intended to be limited to the details shown, since various modifications and structural changes may be made without departing in any way from the spirit of the present invention. For example, the device of this invention can be constructed without the application of digital computing devices and the electromagnetic consumer can also relate to other fields of application.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for controlling and/or regulating current flowing through an electromagnetic consumer, particularly for use in connection with a control system of an internal combustion engine, comprising a current direction changing circuit including four current controlling units connected into a bridge circuit an each having a control input; said electromagnetic consumer being connected across one diagonal of said bridge circuit; a power source having a terminal connected to a junction point of another diagonal of said bridge circuit; a current intensity control circuit including a series connection of an additional current controlling unit with a measuring resistor, said additional current controlling unit having a control input, said series connection being connected between another terminal of said power source and an opposite junction point of said other diagonal so as to pass through said measuring resistor a current flowing through said consumer; means for generating a current intensity control signal; means for generating a polarity control signal; said current intensity control signal being applied to said control input of said additional current controlling unit; and each of said current controlling units of said current direction control circuit having a control input coupled to said means for generating the polarity control signal.

2. A device as defined in claim 1, wherein said means for generating a current intensity control signal includes a comparator connected to a source of reference voltage, to said measuring resistor and to a source of setting voltage.

3. A device as defined in claim 2, wherein said means for generating the current intensity control signal includes a first biasing network connected between said source of reference voltage and ground, a second biasing network connected between said source of setting voltage and ground, a plurality of operational amplifiers each having control inputs connected to said first and second biasing networks and outputs coupled to said control input of said additional current controlling unit, and said measuring resistor being connected to a controlling part of each of said operational amplifiers.

4. A device as defined in claim 1 wherein said means for generating a polarity control signal includes an operational amplifier having an input connected to a source of reference voltage, another input connected to a source of setting voltage and an output connected to the control inputs of the current controlling units of said current direction control circuit.

* * * * *